(12) United States Patent
Muthuswamy et al.

(10) Patent No.: US 11,997,493 B2
(45) Date of Patent: May 28, 2024

(54) INCORPORATING FEEDBACK IN NETWORK GRAPH HOTSPOT IDENTIFICATION

(71) Applicant: International Business Machines Corporation, Armonk, NY (US)

(72) Inventors: Srinivasan S. Muthuswamy, Bangalore (IN); Subhendu Das, Chapel Hill, NC (US); Mukesh Kumar, Bangalore (IN); Carl Ottman, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 17/008,742

(22) Filed: Sep. 1, 2020

(65) Prior Publication Data

US 2022/0070671 A1 Mar. 3, 2022

(51) Int. Cl.
*H04W 12/00* (2021.01)
*G06F 18/00* (2023.01)
*G06N 3/08* (2023.01)
*G06Q 20/10* (2012.01)
*G06Q 20/40* (2012.01)
*H04W 12/12* (2021.01)
*H04W 16/18* (2009.01)
(Continued)

(52) U.S. Cl.
CPC ............ *H04W 12/12* (2013.01); *G06F 18/00* (2023.01); *G06N 3/08* (2013.01); *G06Q 20/10* (2013.01); *G06Q 20/4016* (2013.01); *H04W 16/18* (2013.01); *H04W 24/08* (2013.01); *H04W 24/10* (2013.01)

(58) Field of Classification Search
None
See application file for complete search history.

(56) References Cited

U.S. PATENT DOCUMENTS

| 8,312,056 | B1 | 11/2012 | Peng et al. |
| 8,453,075 | B2 | 5/2013 | Guo et al. |
| 9,742,719 | B2 | 8/2017 | Acharya et al. |

(Continued)

FOREIGN PATENT DOCUMENTS

| CN | 104867055 A | 8/2015 |
| WO | 2018160906 A1 | 9/2018 |

OTHER PUBLICATIONS

Jha et al. published article "Fraud detection and prevention by using big data analytics", Apr. 23, 2020, IEEE (Year: 2020).*

(Continued)

*Primary Examiner* — Naresh Vig
(74) *Attorney, Agent, or Firm* — Daniel M. Yeates

(57) ABSTRACT

A computer-implemented method to generate a hotspot confidence score for a hotspot in a network graph includes, receiving input data, wherein the input data includes a plurality of messages, each message containing a set of message data. The method further includes generating, based on the plurality of messages, a network graph. The method also includes identifying, in the network graph, a first hotspot. The method includes compiling a set of hotspot characteristics for the first hotspot. The method further includes receiving, in response to identifying the first hotspot, a first user feedback. The method also includes, generating, by a learning model, a hotspot confidence score for the first hotspot; and outputting the hotspot confidence score.

20 Claims, 4 Drawing Sheets

(51) Int. Cl.
*H04W 24/08* (2009.01)
*H04W 24/10* (2009.01)

(56) References Cited

U.S. PATENT DOCUMENTS

| | | | |
|---|---|---|---|
| 9,949,136 B2 | 4/2018 | Brisebois et al. | |
| 2007/0106582 A1* | 5/2007 | Baker | G06Q 40/00 705/35 |
| 2012/0259753 A1 | 10/2012 | Orad et al. | |
| 2016/0217470 A1* | 7/2016 | Gerard | G06Q 20/1085 |
| 2017/0293917 A1* | 10/2017 | Dhurandhar | G06Q 30/04 |
| 2019/0236645 A1* | 8/2019 | Kamma | G06N 3/08 |

OTHER PUBLICATIONS

DeepLizard YouTube video "Training a Neural Network explained", Nov. 22, 2017, www.YouTube.com (Year: 2017).*
Published article "Money Laundering and Terrorist Financing Awareness Handbook for Tax Examiners and Tax Auditors", 2019, OECD Secretariat (Year: 2019).*
Data Analysis for Fraud Detection, Sep. 29, 2014, Corporate Compliance Insights (Year: 2014).*
Jason Brownlee, Supervised and Unsupervised Machine Learning Algorithms, Aug. 20, 2020, www.MachineLearningMastery.com (Year: 2020).*
Maxime, Introduction to semi-supervised learning and adversarial training, May 23, 2019, www.medium.com (Year: 2019).*
Savage et al. published article "Detection of money laundering groups using supervised learning in networks", Aug. 3, 2016, RMIT University, Melbourne, Australia (Year: 2016).*
Anselin et al., "Flexible geospatial visual analytics and simulation technologies to enhance criminal justice decision support systems." Crime Mapp 3.1 (2010), 34 pages.
Tur et al., "The CALO meeting assistant system." IEEE Transactions on Audio, Speech, and Language Processing 18.6 (2010): 1601-1611, 11 pages.
Thongsatapornwatana, "A survey of data mining techniques for analyzing crime patterns." 2016 Second Asian Conference on Defence Technology (ACDT). IEEE, 2016, 6 pages.
Yu et al., "Crime forecasting using data mining techniques." 2011 IEEE 11th international conference on data mining workshops. IEEE, 2011, 8 pages.
Lee et al., "An iron core probe based inter-laminar core fault detection technique for generator stator cores." 2003 IEEE Power Engineering Society General Meeting (IEEE Cat. No. 03CH37491). vol. 3. IEEE, 2003, 8 pages.
Muthuswamy et al., "System and Method to Detect and Define Activity and Patterns on a Large Relationship Data Network", U.S. Appl. No. 16/824,932, filed Mar. 20, 2020.

* cited by examiner

INCORPORATING FEEDBACK IN NETWORK GRAPH HOTSPOT IDENTIFICATION

BACKGROUND

The present disclosure relates to pattern detection, and, more specifically, incorporating feedback to increase accuracy of hotspot detection.

There is a need for monitoring transactions and activity of account holders at institutions to detect any fraudulent or criminal activity. Detecting activity indicative of fraudulent or criminal activity is increasingly difficult due to the involvement of a large amount of information, such as multiple transactions, large numbers of parties, and ease of performing the transactions.

SUMMARY

Disclosed is a computer-implemented method to generate a hotspot confidence score for a hotspot in a network graph. The method includes, receiving, by a processor input data, wherein the input data includes a plurality of messages, each message containing a set of message data. The method further includes generating, by a pattern detector, based on the plurality of messages, a network graph. The method also includes identifying, in the network graph, a first hotspot. The method includes compiling a set of hotspot characteristics for the first hotspot. The method further includes receiving, in response to identifying the first hotspot, a first user feedback. The method also includes, generating, by a learning model, a hotspot confidence score for the first hotspot; and outputting the hotspot confidence score and the network graph.

Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

There is a regulatory need for monitoring financial transactions and activity of account holders at financial and insurance institutions to detect any fraudulent or criminal activity such as, for example, money laundering or insurance fraud. Detecting financial activity indicative of fraudulent or criminal activity is increasingly difficult due to the involvement of a large amount of information, such as multiple financial transactions, large numbers of parties, and ease of performing the transactions.

In order to better identify fraudulent or illegal activity, embodiments of the present disclosure may increase the efficiency of automatically detecting potential fraudulent activity and/or reduce the number of false positive indications of suspicious activity. In some embodiments, a fraud detection system can utilize a combination of pattern identification, hotspot identification, and/or user feedback. Additionally, embodiments of the present disclosure can generate a confidence score, based on the analysis, that represents the likelihood a certain pattern represents fraudulent or non-fraudulent activity.

Data Processing System in General

Figure 1:
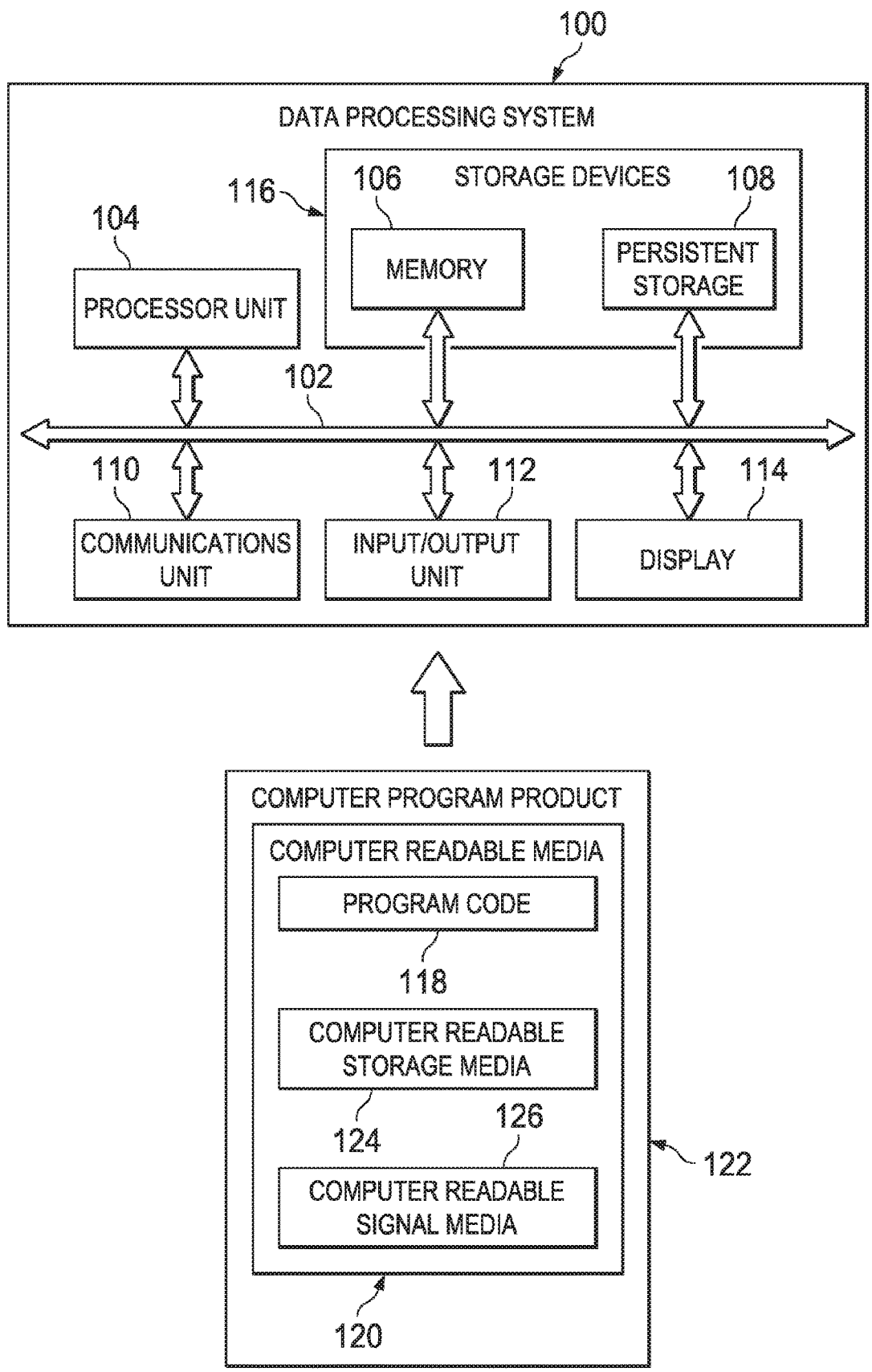
FIG. 1 is a block diagram of a DPS according to one or more embodiments disclosed herein.

FIG. 1 is a block diagram of an example data processing system (DPS) according to one or more embodiments. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Identifying money laundering and other fraudulent and/or illegal activity can include several processes working in unison. In some embodiments, a system can analyze transaction data and develop one or more network graphs (or network maps). The network graphs can show how various accounts, account owners, and/or transactions (or group of transactions) are related. The network graph can be further analyzed to identify one or more hotspots. A hotspot can be a node (e.g., account, account holder, etc.) or a connection (e.g., one or more transactions related to two or more nodes) that can indicate potential fraudulent activity.

Human involvement may, in some instances, may be helpful for fraud detection. However, with the high number of transactions that can occur, it may be impractical for a human to review all transactions, network graphs, and even all identified hotspots. Embodiments of the present disclosure can increase the efficiency of hot spot detection and/or reduce the number of false positive hotspots.

The present disclosure is directed to a system and methods to incorporate network characteristics (or network properties) of a relationship network or graph, hotspot characteristics, and user feedback to improve automatic hotspot detection. The data collected, analyzed, and reviewed can be used to train and/or update a learning model that identifies potential hotspots in a chain of network interactions (e.g., financial transactions, insurance claims). In some embodiments, the network graph characteristics, the hotspot characteristics, and/or the feedback can be used to generate one or more confidence scores. The confidence score can represent the likelihood that the hotspot and/or network graphs indicate fraudulent (or illegal) activity.

Embodiments of the present disclosure can create a relationship network (or network graph), (e.g., a large-scale relationship network), and/or define and detect data patterns on the relationship network, (e.g., the graph). For purposes of this disclosure, relationship network and network graph are used interchangeably. In some embodiments, the systems and methods include ingesting data, in an aspect large amounts of data, and processing the data to form a relationship network or data network, and selecting data desirous of being detected by a user, seeding a pattern detection module with a configuration and definitions for the desired data pattern for detection, running the pattern detection module to pass messages through the relationship network, and implementing an insights module to aggregate messages and generate insights. In one or more embodiments, the system and method capture data patterns and activity in a uniform manner to create a large relationship network or graph and run message propagation techniques to detect data patterns that may be indicative of suspicious activity or behavior. The system and method in one or more embodiments can capture and detect different data patterns indicative of risk and/or suspicious activity, such as, for example, guilt by association, circular money flow, mule detection, and the like.

Embodiments of the present disclosure can identify one or more hotspots on the network graph. In addition, a list of hotspot characteristics will be compiled with the hotspot. The characteristics can be specific factors that increase likelihood that a node is a potential hotspot. A hotspot can be a node on the network graph that can indicate potential fraudulent or illegal activity (e.g., employee security risk, wire fraud, insurance fraud, etc.).

Embodiments of the present disclosure can receive user feedback in response to hotspot identification. A user can indicate, after reviewing the relevant data, whether the hotspot may indicate fraudulent activity. The user feedback can be incorporated into the hotspot identification process.

Embodiments of the present disclosure can update/train a learning model. The learning model can incorporate the network graph characteristics, the hotspot characteristics, and the user feedback to generate a hotspot confidence score. In some embodiments, the hotspot confidence score can represent the likelihood a node indicates potentially fraudulent activity. In some embodiments, a confidence score can be generated for every node in the network graph.

Embodiments of the present disclosure can reduce the number of false positive identifications of hotspots, thus allowing users to focus on hotspots with higher probabilities of fraud and thereby preventing fraudulent activities from occurring.

The aforementioned advantages are example advantages, and embodiments exist that can contain all, some, or none of the aforementioned advantages while remaining within the spirit and scope of the present disclosure.

Figure 2:
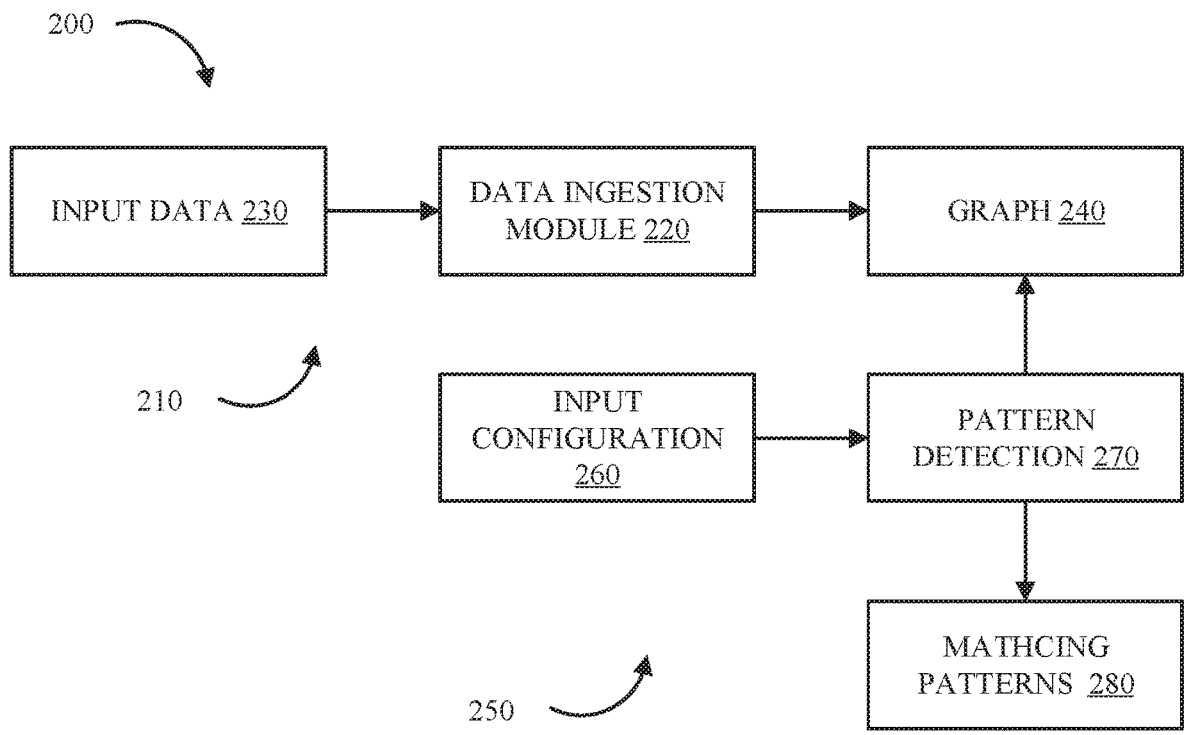
FIG. 2 depicts a block diagram of an embodiment of a system for processing data, including creating a relationship network, defining and detecting data patterns according to one or more embodiments disclosed herein.

FIG. 2 illustrates a block diagram of an embodiment of a system and method to create a large relationship network or graph, and/or define and detect different data patterns in the relationship network, and/or collect and aggregate insights based upon the relationship network. In a first part 210 of system 200, data ingestion module 220 reads input data 230 and creates graph 240. Graph 240 in one or more embodiments is a large scale relationship network, also referred to as a data network. The data ingestion module 220 includes circuitry and logic to receive the input data 230 and process the data to output graph or network 240. The system 200 is particularly adapted to define and/or detect data patterns in the relationship network indicative of suspicious activity typically associated with fraud, money laundering, and/or criminal activity. In one or more embodiments, the input data 230 comprises parties, accounts, transactions, etc. For example, where a financial institution, such as a bank, desires to determine if there is a money laundering scheme or other fraud, for example as a result of governmental oversight, or regulations, such as anti-money laundering (AML) laws, the input data 230 can comprise: the transactions occurring with or being processed by the financial institution; the parties to any financial transaction with or through the financial institution; and account information (the customers) of the financial institution. In the case of an insurance organization and the like, the input data 230 can comprise: the parties doing business with the insurance organization; the claims made with the insurance organization; policy information (the customers) of the insurance organization, the identity of any agencies or brokers that were involved in underwriting the policy, and any parties involved in treating the claim, e.g., auto body shop fixing a motor vehicle, physician treating patient, etc. The examples above are not limiting and there can be other situations where the system 200 will have applications, and additional or other input data can be provided.

The input data 230 is input into the data ingestion module 220 which outputs as a network graph 240. The data ingestion module 220 contains circuitry and logic to receive input data 230 and process the data to create the network graph 240. In most instances, large amounts of data are input and processed by the data ingestion module 220, and the network graph 240 is a large scale network graph 240. The network graph 240 includes, for example, objects and relationships. Objects, for example, can be people, accounts, policies, etc. The transactional or relationship network 240 from processing input data 230 of a financial institution would include, for example, parties, party-account relationships, account-account transactional relationships, and party-party relationships.

Figure 3:
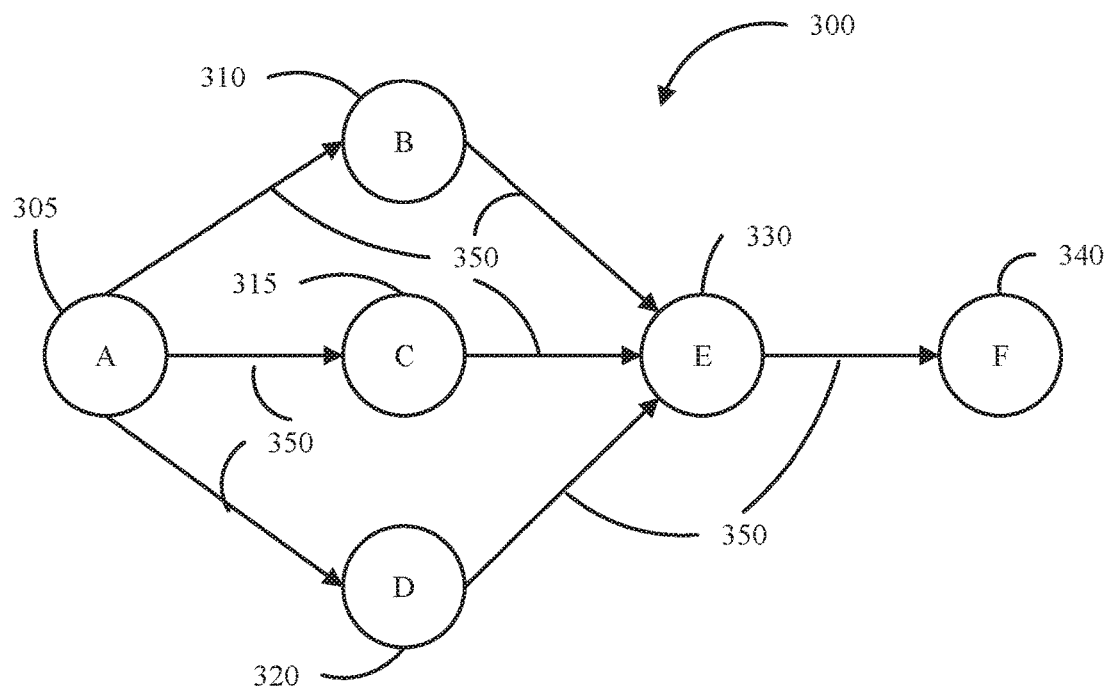
FIG. 3 is an illustration of an embodiment of a relationship network according to one or more embodiments disclosed herein.

FIG. 3 illustrates an example of a portion of the transactional network or transactional graph 240 produced by the data ingestion module 220 based upon input data 230 of a financial institution. It can be appreciated that the relationship network or graph 240 typically will include much more data and be of a much larger scale than illustrated in FIG. 3. Objects 305, 310, 315, 320, 330, and 340 represent accounts and/or parties A, B, C, D, E, and F respectively, and are shown as unique nodes in a network graph 300. Links 350 show the relationship between each node (e.g., a map of a pattern of a transaction flow, relationship between each party, etc.). For example, network graph 300 can represent a pattern of 305, transferring money to each of 310 (B), 315 (C), and 320 (D). Then each of those receivers transfer the received money to the same account 330 (E). In this example, each of links 350 can represent one or more transactions and/or other relationships (e.g., parent/subsidiary business relationships).

Referring again to FIG. 2, the second part 250 of the system 200 includes input configuration module 260, and pattern detection module 270 for matching data patterns 280. The input configuration module 260 sets up the system to detect desired data patterns indicative of activity or behavior in the transaction network. The input configuration module 260 contains circuitry and logic to receive the input configuration information from the user, and process and/or transmit information and data to the pattern detection module 260. A user inputs information to the system 200, and in particular the second part 250 of the system, vis-à-vis the input configuration module 260 so that the system knows the type of data patterns indicative of suspicious activity or behavior that the system 200, and in particular the second part 250 of the system 200, will search for and detect. That is, the user defines through the input configuration module 260 the type of data pattern 280 the system 200 should detect, and in particular the type of pattern 280 the second part 250, more particularly the pattern detection module 270, of the system 200 should search for in the relationship network or graph 240. The pattern detection module 270 reads data from the network or graph 240 and detects patterns of behavior or activity 280 in the relationship network 240 as defined by the input configuration selected and input by the user. The pattern detection module 270 contains circuitry and logic to receive input configuration data from input configuration module 260, receive relationship network data, process the input configuration and the relationship network data 240 to detect data patterns, and, in one or more embodiments, create insights, including in an aspect aggregating, and applying the insights to the relationship network 240.

Figure 4:
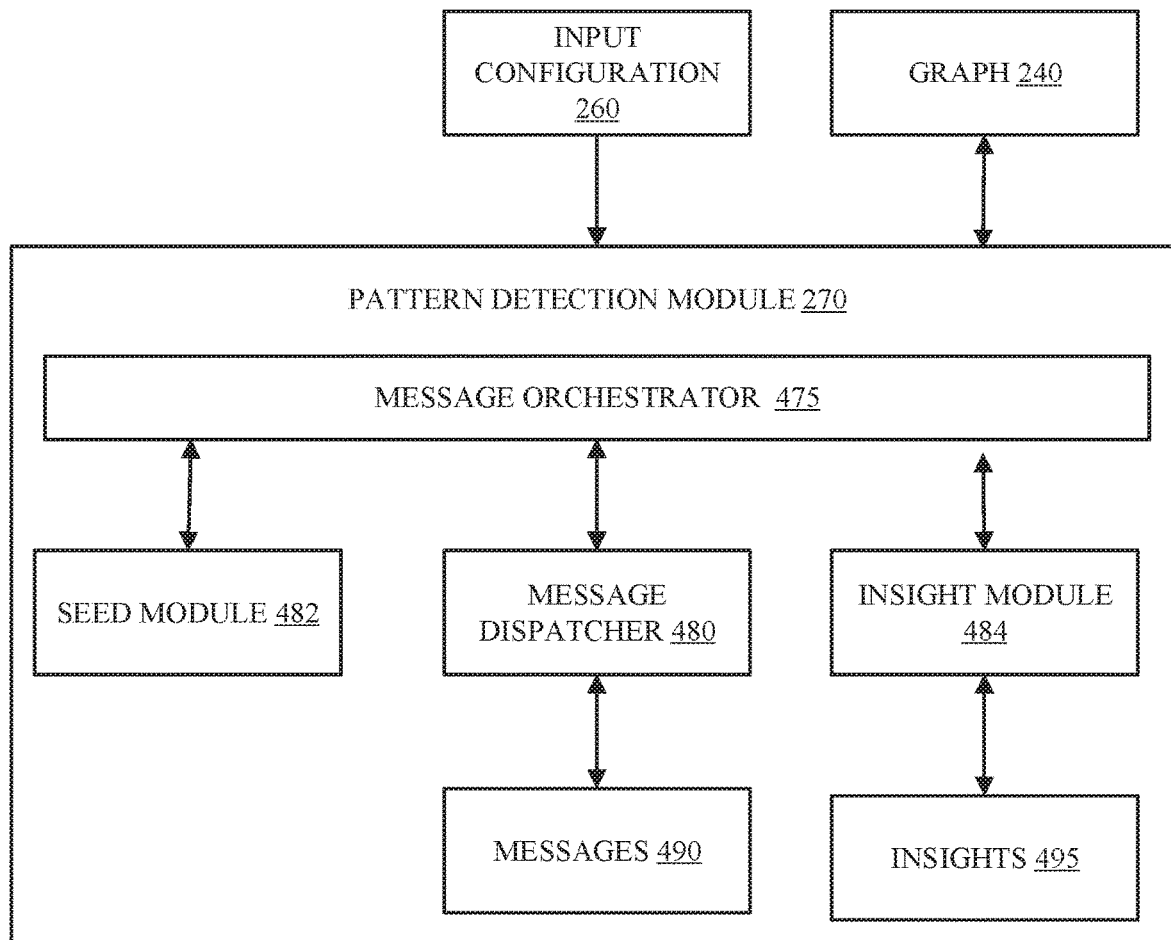
FIG. 4 depicts a block diagram of an embodiment of a pattern detection module according to one or more embodiments disclosed herein.

FIG. 4 illustrates an embodiment of pattern detection module 270. To illustrate pattern detection module 270, but not to limit embodiments, FIG. 4 is described within the context of FIG. 2. Where elements referred to in FIG. 4 can be consistent with elements shown in FIG. 2, the same reference numbers are used in both figures.

Pattern detection module 270 in one or more embodiments includes a message orchestrator 475, a seed module 482, a message dispatcher 480, and an insights module 484. Pattern detection module 270 in an aspect also includes a message repository 490 and an insights repository 495. The message orchestrator 475 contains circuitry and logic to control the seed module 482, the message dispatcher 480, and the insights module 484, and to invoke the modules for detecting patterns 280 in the network or graph 240. As an overview, the message orchestrator 475 receives the input configuration 260, which instructs the message orchestrator 475 on the type of data pattern 280 to detect and the criteria, filters, and/or rules to apply during data pattern detection. The message orchestrator 475 calls the seed module 482 and, in an embodiment, passes the input configuration onto, or defines the input configuration for, the seed module 482. The seed module 482 contains circuitry and logic to generate, initialize, or initiate the seed messages, which in an embodiment are sent to the message repository 490. After transmitting the messages to the message repository 490, seed module 482 gives control back to the message orchestrator 475. The message orchestrator 475 then involves the message dispatcher module 480 which contains circuitry and logic to read the messages and dispatch each message to its target receiver as defined by the criteria, filter and/or rules selected by input configuration 260. The message dispatcher module 480 propagates and dispatches all messages until there are no more messages in the message repository 490 to process. The message dispatcher module 480 also maintains the message repository 490. The message dispatcher module 480 propagates the messages by reading the network/graph 240 and forwarding, saving, and/or terminating the messages according to the criteria, filters, and/or rules defined and selected by input configuration 260. The messages that meet the criteria defined by the system (based upon the input configuration) are saved by the insights module 484 as insights in the insights repository 495. The insights module 484 contains circuitry and logic to maintain and save the insights in the insights repository 495. The message orchestrator 475 calls the insights module 484 to aggregate the insights saved in the insights repository 495, and in one or more embodiments saves and/or applies the insights to the graph 240. The message orchestrator 475, the seed module 482, the message dispatch module 480, and the insights module 484 all contain circuitry and logic to perform their recited functions.

The seed module 482, based upon input configuration 260 received by the message orchestrator 475, generates or prepares the initial seed messages. The messages, including the initial seed messages, contain and identify information based upon the type of pattern to be detected and the criteria, filters, and/or rules selected through the input configuration 260 and implemented by the seed module 482 and the message dispatcher module 480. The information identified and/or contained in a (propagated) message, including an initial seed message can contain: original sender data/identifier; sender data/identifier; receiver data/identifier; target receiver data/identifier; date/time data; trace data; and score (other transaction data). The trace data is the path taken through the network 240 from the initiator or seed node (the original sender) to the receiver node. The information identified in the seed message is updated as the message is forwarded and propagated in the relationship network.

When the seed module 482 prepares the initial seed messages, the "original sender" (e.g., 305 A) is identified in the network 240 and is referred to as the initiator or seed node. The seed module 482, based upon the input configuration 260 and the relationship network 240, runs a filter, such as for example applying the rules or criteria selected as input configuration data, to identify all the seed or initiator nodes. The seed module 482 also in one or more embodiments identifies the "sender", which in the case of the initial messages is the same as the "original sender". The seed module 482 also in an embodiment identifies the "receiver" and the "target receiver". A "sender" who is not the same as the "original sender" can have first been a "receiver" and subsequently forward the message to become a "sender" (or "additional sender"). The "receiver" is the particular node that receives the message and can be a party object or an account object. To determine the "receiver" the seed module 482 in an aspect looks at the relationship data of the initiator or seed node from the relationship network or graph 240, and from the relationship network 240 the seed module 482, identifies all the nodes to which the initiator node is directly connected. The seed module 482 generates or prepares the initial messages based upon the nodes to which the initiator or seed node is directly connected. That is, in one or more embodiments, for each node that the initiator or seed node is directly connected, the seed module 482 creates one initial message. If the initiator or seed node is directly connected to four (4) nodes for example, then in an embodiment four (4) initial messages are created. The seed module 482, when creating the initial messages, identifies the initiator or seed node as the "original sender" and the directly connected node as the "receiver." The "target receiver" is the object type, e.g., a party or account node/object or any other type of object that is supposed to carry the propagated risk.

The seed module 482 also sets forth the trace or the pathway for the initial message 505. The seed module 482 also sets or assigns the weight score to be associated with the relationship between the nodes based upon the input configuration 260. That is, the weight or score is set by the user, and may be set by the type of activity being searched for in the network. These initial messages need to be sent to and/or stored in the message repository 490 so the seed module 482 involves the message dispatcher 480 to send the initial message(s) to the message repository 490 and the initial messages are sent to and stored in the message repository 490. Control is then turned back from the seed module 482 to the message orchestrator 475.

The system 200 has now been initialized with the initial seed messages generated and stored in the message repository 490, and the message orchestrator 475 has control. The message orchestrator 475 calls the message dispatcher 480 to propagate the initial messages through the network graph 240 and detect certain data patterns 280. The message dispatcher 480 looks at the message repository 490 and reads the initial message(s). The message dispatcher 480 reads the messages for a given node, and: (a) if the given object/node is the receiver node and if the reach factor (which is a measure of the degree of relationship with the initiator node) is reached, then the message is archived (stored) as an insight in the insights repository 495; (b) if the given object/node is the receiver node, but the reach factor is not reached, then the message is archived (stored) as an insight in the insights repository 495 and the message is forwarded in the network 240; and (c) if the given object/node is a pass-through node, then the message is forwarded in the network 240 and no insights are saved to the insights repository 495. In one or more embodiments, the message is forwarded to the immediate surrounding directly connected nodes as determined from the relationship network 240. In an aspect, and according to the input configuration, the message(s) are not forwarded to a node that forms a loop. That is, in an embodiment, a message whose trace or pathway forms a loop where it is propagated or forwarded to the same node more than once is deemed invalid and is not undertaken or performed by the message dispatcher module 480 (or system 200). In a different aspect, and according to the input configuration, the messages are permitted to form a loop. To save insights to the insights repository 495, in one or more embodiments, the message dispatcher 480 invokes the insights module 484 to save the message to the insights repository 495. In one or more embodiments the insights can be saved on a node basis. The reach factor, also referred to as the relationship degree, is the number of receiver nodes in the pathway or trace to connect back to the initiator or seed node. The reach factor or relationship degree in one or more embodiments is programmable and variable, and can be input by a user when setting the input configuration 260 for the system 200, or more particularly the second part 250 of the system 200.

The message dispatcher module 480 fetches the first initial message or seed message from the message repository 490, and, based upon the information in the initial message: saves the initial or seed message to the insights repository 495 as described above; terminates the initial message based upon the reach factor; and/or forwards the seed message in the relationship network as a propagated message based upon the reach factor and/or whether the receiver node is a pass through node as defined in the system. For any seed or initial message that is to be forwarded as a propagated message, all the nodes directly connected to the receiver node of the seed message are identified in the relationship network 240 and the seed message is forwarded to those directly connected nodes as a propagated message.

For each propagated message, if the directly connected node is: (a) within the reach factor, the propagated message is saved and is propagated in the relationship network 240; (b) at the reach factor, the propagated message is saved as an insight and is not forwarded in the relationship network 240 (i.e., the propagated message is terminated); and (c) a pass-through node, the propagated message is forwarded in the network 240. This process of determining the directly connected nodes and forwarding the propagated message in the relationship network 240 is continued until the propagated message is fully propagated and forwarded and has no more valid, directly connected nodes (e.g., the propagated message is beyond the reach factor, or, in one of more embodiments, the pathway or trace of the propagated message forms a loop). As the seed messages and propagated messages are propagated through the relationship network 240, the information contained in the messages in one or more aspects changes and is updated.

The message dispatcher 480 propagates the messages through the network 240 until each message is fully propagated (e.g., beyond the reach factor determined by the input configuration 260). The message dispatcher 480 propagates each message through the network 240 until no more messages are left in the system (i.e., the message repository 490). When all the messages are processed and propagated through the network 240, control from the message dispatcher 480 goes back to the message orchestrator 475. The message orchestrator 475 can invoke the insights module 484 to collect insights (e.g., the messages saved to the insight repository 495). In one or more embodiments, the insights module 484 looks at all the archived messages saved to each node in the insights repository 495 and generates insights for each node. In an aspect, if the aggregate function is selected, the messages saved to the insight repository 495 are aggregated by the condition (e.g., one degree of relationship difference, or two degree of relationship difference), and scores are accumulated, for example, on a node-by-node basis. In one or more embodiments, the message orchestrator 475 receives the insights, e.g., the saved messages, from the insights module 484 and adds the insights or portions thereof to the network or graph 240. The insights and the manner of saving the insights can vary with the system and the pattern that is desired to be detected. The input configuration 260 in one or more aspects permits the input criteria, the insights to be collected, and how such insights will be presented and/or transmitted to the end user, to be varied.

In some embodiments, the system can be used to identify/detect hotspots. A hotspot can include data patterns that are indicative of suspicious activity or behavior that may need to be further investigated or reported. In an aspect, the system can be used to detect data patterns indicative of risk by association, money laundering schemes, mule detection, circular money flow, etc. In some embodiments, a hotspot can be a node (e.g., object 330, illustrated in FIG. 3), a transaction, a group of transactions, an account, a bank, a pattern, a geographic location, any combination of the foregoing, and the like.

In some embodiments, hotspot detection is based on input configuration. The system receives input configuration from a user, including the type of data pattern (e.g., activity) the system should detect. In one or more embodiments, the input configuration 260 sets a number of criteria and filters. The criteria can include a reach factor. The reach factor can represent how suspicious activity can affect surrounding parties (e.g., how many nodes are affected by a potential hotspot). The reach factor is set, and the criteria to terminate the message propagation are set, then the message propagation will terminate upon reaching the reach factor. The input criteria includes for one or more embodiments setting node and edge filters, trace (or pathway), cycles allowed, the path, and how insights are aggregated.

In some embodiments, a criterion can include a behavior risk. A behavior risk can include identifying known parties and/or identifying associations with known parties, where the known parties are flagged. For behavior risk, among other input criteria, the "seed nodes" are set as a party associated with or that has been identified as having a suspicious activity report (SAR), a politically exposed person (PEP), or a party that has received sanctions; and "receivers" are set as a party; and pass-through nodes are set as accounts. A PEP is one who is entrusted with a prominent function that generally presents a higher risk for being involved in fraudulent activity.

In some embodiments, one criteria includes a structural risk. The structural risk can include the shape/configuration of the network graph. The configuration can include how the accounts (e.g., account holders, controlling parties) are connected and/or interact (e.g., as subsidiaries, etc.). In some embodiments, one criterion includes transactional risk. The transactional risks can include amounts (e.g., unusually large amounts, amounts just under mandatory reporting limits, etc.), frequency, and/or locations (e.g., both originating and final locations). For example, if an account routes multiple chains of transactions into country A, that can indicate a transactional risk.

In some embodiments, the system identifies one or more characteristics of each hotspot. The characteristics can include a pseudo description of the hotspot. Some potential characteristics can include transactions moving out of or into specific monetary systems (e.g., international borders, banks, organizations, etc.), transactions involving a risky party, large sums, large deposit with subsequent wire transfers, routing patterns (e.g., loops, common destinations, etc.), and other similar factors.

It is contemplated that the system will be updated with additional input data over time. For example, after a first run of the system and method, a bank, financial institution, insurance organization, etc., could periodically, for example daily, monthly, bi-yearly, etc., update the system with additional data. In one or more embodiments, the system detects updates to the network 240 as a new object/node added, a new relationship added, an existing relationship updated, an object/node deleted, or a relationship deleted. The system in one or more embodiments will review the traces and determine which paths need to be redone, e.g., re-propagated, or where there are new paths to be traversed. The system and method in one or more embodiments can be updated, and, in an embodiment, a trace is used to determine one or more paths needed to recreate the message propagation in the relationship or data network to obtain updated insights based upon new updated data or to determine any new path that needs to be traversed because of the new data. The system when performing the update will initiate the propagation, add updates to the archives, and re-run the insights module on the impacted nodes where updates are added to the insights repository and insights are regenerated.

In some embodiments, the system can incorporate user feedback into the network graph. The user feedback can be included in the additional data. In some embodiments, feedback is received in response to the system identifying a hotspot. The feedback can be an indication, based on a user's review of the network graph, of the user's agreement/disagreement with the hotspot designation. In some embodiments, the feedback can be binary (e.g., yes/no). In some embodiments, the feedback includes the user hiding (or marking or indicating), one or more nodes/relationships in the network graph. The node can be hidden in response to a user determining the node indicates noise in the network graph. Noise can be considered a noise/relationship in the graph is not relevant to the hotspot characteristics/identification.

In some embodiments, multiple instances of feedback, for a hotspot, can be received. For example, a first feedback can be from a first reviewer that indicates a more thorough review is needed. A second reviewer, more senior than the first, can then review and provide more feedback based on the result/value of the first feedback.

In some embodiments, the system can generate a confidence score. The confidence score can represent the likelihood a particular portion of the network graph represents suspicious activity, or, said differently, the likelihood a hotspot correctly identified fraudulent activity. In some embodiments, the confidence score is based on a combination of the network graph/network characteristics, the hotspot characteristics, and the user feedback. In various embodiments, the confidence score can be a number between 0.0 and 1.0. The closer to 1.0, the higher confidence the identified hotspot includes fraudulent activity (or non-fraudulent activity depending on the configuration of the output).

In some embodiments, the various factors can be weighted in any manner. In some embodiments, the weight of the feedback is based on the source of the feedback. The source can be a specific user. For example, assume there are three users that can provide feedback. The first user is junior/inexperienced, the second user has intermediate experience, and the third user is an expert. The weight of the third user can be greater than the weight given to feedback from the second user. This can be both for the same hotspot, or for different hotspots. In various embodiments, there can be any number of inputs, from any number of users, each weighted in any way.

In some embodiments, the confidence score is generated by a neural network (or learning model). In some embodiments, the network characteristics, the hotspots characteristics and the user feedback can be inputs into the neural network. The neural network can be trained by analyzing all current and previous data. In some embodiments, known fraudulent activities are fed into the learning model. These can be used as training data. In some embodiments, the user feedback adds to the training data (or ground truth). This will allow the learning model to distinguish between fraudulent and non-fraudulent activity, even when the network graph may be similar. In some embodiments, the learning model uses reinforced learning (RL) training. RL training provides positive feedback to maximize a total reward in response to the learning model correctly identifying hotspots.

Figure 5:
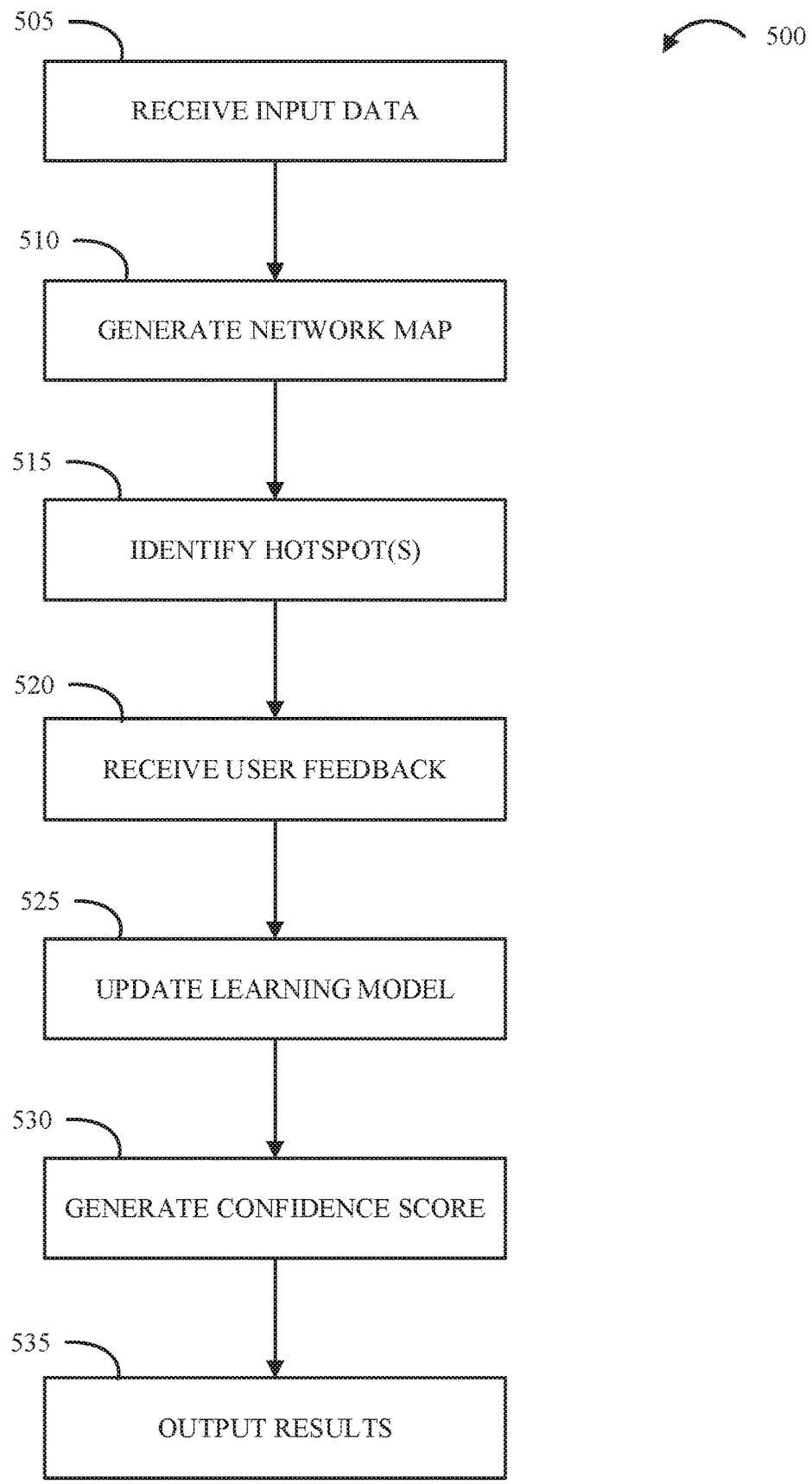
FIG. 5 illustrates a flow chart of an example method to generate a hotspot confidence score according to one or more embodiments disclosed herein.

In some embodiments, the system may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the BBSH may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques FIG. 5 is an example flowchart in accordance with at least one embodiment illustrating and describing a method of generating a confidence score for a hotspot in a network graph including, detecting data patterns in a relationship network, identifying one or more hotspots within the relationship network, and incorporating user feedback into the confidence score. While the method 500 is described for the sake of convenience and not with an intent of limiting the disclosure as comprising a series and/or a number of steps, the process does not need to be performed as a series of steps and/or the steps do not need to be performed in the order shown and described with respect to FIG. 5, but the process may be integrated and/or one or more steps may be performed together, simultaneously, or the steps may be performed in the order disclosed or in an alternate order.

The method 500 includes, at 505, receiving input data. In some embodiments, the input data includes message data (or transaction data). In some embodiments, the input data is received at input data 230. The message data can include all relevant data for each message. For example, if the input data can include financial transactional information, parties to financial transactions, account numbers involved in the transactions, amounts and times of the transactions, and customers of the transactions, originating and final location of the transactions (e.g., transfers), can be included with the message. The input data can include other transactional information, such as, for example, insurance transactional information.

In some embodiments, the input data includes input configuration criteria. The configuration criteria inform the system what data patterns to detect in the relationship network and, in one or more embodiments, what criteria, filters, and/or rules to use when detecting data patterns and/or hotspots in the relationship network.

The method 500 includes, at 510, generating one or more network maps (e.g., graph 240). In some embodiments, generating the network map includes: detecting data patterns in the relationship network or graph; and/or includes, in one or more aspects, receiving a user-provided input configuration to the system. The input configuration informs the system what data patterns to detect in the relationship network and, in one or more embodiments, what criteria, filters, and/or rules to use when detecting data patterns in the relationship network. In some embodiments, the network map includes one or more nodes and connections between the nodes. Each node can represent an account, a user, an organization, or something similar. The connections can represent relationships, such as transaction between the two nodes, and/or other connections (e.g., both use a common bank).

The method 500 includes, at 515, identifying one or more hotspots. In some embodiments, the hotspot is identified by analyzing the network map and detecting scenarios that may include fraudulent activity. In some embodiments, the hotspot is identified by pattern detection 270. The scenarios can be based on previous known examples of fraudulent activity, and/or scenarios that are otherwise suspicious. The rules defining what can be considered a hotspot can be included in the configuration criteria.

In some embodiments, identifying the one or more hotspots includes generating characteristics for the hotspots. The characteristics can include the factors (e.g., transaction data), that caused the hotspot to be identified.

The method 500 includes, at 520, receiving user feedback. In some embodiments, the feedback is received in response to a user reviewing the hotspot characteristics. The system can indicate, through a user interface, that it has detected a hotpot. Additionally, they system may display the network graph, hotspot characteristics, and all/some of the relevant transaction data. The user can indicate whether the hotspot resembles potential fraudulent activity.

In some embodiments, a positive indication (meaning the hotspot resembles feedback) means the hotspot can be routed to a second user to provide more feedback. In some embodiments, the one or more instances of feedback can be given different weights based on the user and/or the experience of the user. For example, each user can be assigned a rank (e.g., experience level), or a weighting factor. The higher the rank or weighting factor the more influence the feedback will have.

In some embodiments, the feedback includes the user hiding (or marking or indicating), one or more nodes/relationships in the network graph. The node can be hidden in response to a user determining the node indicates noise in the network graph. Noise can be considered a noise/relationship in the graph and is not relevant to the hotspot characteristics/identification. For example, assume a network graph includes a node that represents a bank that has issued a loan to a related node, and the connection between the node represents a regular (e.g., monthly payment) transaction between the party. A user can determine that connection is legitimate and creates extra data in the hotspot analysis. The user can hide that node and connection. In some embodiments, a hidden node can be validated (or approved) by a second user. The second user can be of higher experience to than the first user. In some embodiments, a user can hide one or more nodes in a network graph. In some embodiments, the hidden node is not considered in the hotspot analysis. In some embodiments, the hidden node is given a different weight (e.g., lower) in the hotspot analysis.

The method 500 includes, at 525, updating a learning model. In some embodiments, the learning model is updated in response to receiving user feedback and/or additional transaction/message data related to the network graph. In some embodiments, updating the learning model can include re-training the model. In some embodiments, the system re-identifies hotspots (either the same or different) based on the updating of the learning model. In some embodiments, updating the learning model includes training the learning model. The first training can occur prior to receiving feedback and/or network identification. The first/initial training can be based on the configuration data.

The method 500 includes, at 530, generating a confidence score for the hotspot. In some embodiments, the confidence score can be an output of the learning model. In some embodiments, the confidence factor can be a combination of network characteristics, the hotspot characteristics, and the user feedback. The weight of each factor and subfactor can be determined by the learning model.

The method 500 includes, at 535, outputting results. This can include displaying the potential hotspot with the confidence score, and other network characteristic and hotspot characteristic data. In some embodiments, the output includes displaying the network graph with the one or more hotspots indicated (e.g., highlighted) on the network graph. In some embodiments, the output can include notifying (e.g., an alarm, an email notification, etc.) the user that a hotspot has been identified. This can allow users to investigate and review the highest confidence threats. Additionally, incorporating all inputs into a single confidence score can reduce the number of false positive identification of hotspots.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
receiving, by a processor, input data, wherein the input data includes a plurality of messages, each message containing a set of message data;
generating, by a pattern detector and based on the plurality of messages, a network graph;

analyzing the network graph to identify one or more hotspots, wherein each hotspot of the one or more hotspots is identified as a scenario that includes potentially fraudulent activity;

identifying, in the network graph and by a learning model, a first hotspot of the one or more hotspots;

compiling a set of hotspot characteristics for the first hotspot, wherein the identifying of the first hotspot is based a first characteristic of the set of characteristics;

indicating, to a user through a network interface, the first hotspot;

receiving, in response to identifying and indicating the first hotspot and in response to a review of the hotspot characteristics for the first hotspot, a first user feedback, wherein the first user feedback includes a level of agreement and the first hotspot includes the potentially fraudulent activity;

updating, based on the first user feedback, the learning model, wherein the updating is configured to reduce a number of false positive hot spots;

generating, by the learning model and based in part on the first user feedback, a hotspot confidence score for the first hotspot; and outputting, by the network interface, the hotspot confidence score and the network graph.

2. The method of claim 1, wherein the hotspot confidence score is based on a weight for each of a location within the network graph, the set of hotspot characteristics, and the first user feedback.

3. The method of claim 2, wherein said each weight is determined by the learning model.

4. The method of claim 1, further comprising:
wherein generating the hotspot confidence score is in response to updating the learning model.

5. The method of claim 1, wherein the network graph is configured to display relationships between one or more nodes in the network graph.

6. The method of claim 5, wherein the first hotspot is a first node of the one or more nodes.

7. The method of claim 1, wherein the input data includes configuration criteria, wherein the configuration criteria are configured to identify data patterns to detect in the network graph.

8. The method of claim 1, wherein each message includes a financial transaction.

9. The method of claim 8, wherein the set of data includes at least one of: a source account, a destination account, a first associated party, an amount, a source location, a destination location, and a transaction time.

10. The method of claim 1, wherein each message includes an insurance claim.

11. A system comprising:
a processor; and
a computer-readable storage medium communicatively coupled to the processor and storing program instructions which, when executed by the processor, are configured to cause the processor to:
receive input data, wherein the input data includes a plurality of messages, each message containing a set of message data, wherein the first user feedback includes a level of agreement and the first hotspot includes the potentially fraudulent activity;
generate, based on the plurality of messages, a network graph;
analyze the network graph to identify one or more hotspots, wherein each hotspot of the one or more hotspots is identified as a scenario that includes potentially fraudulent activity;
identify, by a pattern detector and by a learning model, in the network graph, a first hotspot of the one or more hotspots;
compile a set of hotspot characteristics for the first hotspot, wherein the identifying of the first hotspot is based a first characteristic of the set of characteristics;
indicate, to a user through a network interface, the first hotspot;
receive, in response to identifying and indicating the first hotspot and in response to a review of the hotspot characteristics for the first hotspot, a first user feedback, wherein the first user feedback includes a level of agreement, the first hotspot includes the potentially fraudulent activity, and the first user feedback includes hiding a second node of the network graph;
updating, based on the first user feedback, the learning model, wherein the updating is configured to reduce a number of false positive hot spots;
generate, by the learning model and based in part on the first user feedback, a hotspot confidence score for the first hotspot; and
output, by the network interface, the hotspot confidence score and the network graph.

12. The system of claim 11, wherein the hotspot confidence score is based on a weight for each of a location within the network graph, the set of hotspot characteristics, and the first user feedback.

13. The system of claim 11, wherein the hotspot confidence score is generated in response to the learning model being updated.

14. The system of claim 11, wherein the network graph is configured to display relationships between one or more nodes in the network graph.

15. A computer program product, the computer program product comprising a computer readable storage medium having program instructions embodied therewith, the program instructions executable by a processing unit to cause the processing unit to:
receive input data, wherein the input data includes a plurality of messages, each message containing a set of message data;
generate, based on the plurality of messages, a network graph;
analyze the network graph to identify one or more hotspots, wherein each hotspot of the one or more hotspots is identified as a scenario that includes potentially fraudulent activity;
identify, by a pattern detector and by a learning model, in the network graph, a first hotspot of the one or more hotspots;
compile a set of hotspot characteristics for the first hotspot, wherein the identifying of the first hotspot is based a first characteristic of the set of characteristics;
indicating, to a user through a network interface, the first hotspot;
receive, in response to identifying and indicating the first hotspot and in response to a review of the hotspot characteristics for the first hotspot, a first user feedback, wherein the first user feedback includes a level of agreement and the first hotspot includes the potentially fraudulent activity;

updating, based on the first user feedback, the learning model, wherein the updating is configured to reduce a number of false positive hot spots;

generate, by the learning model and based in part on the first user feedback, a hotspot confidence score for the first hotspot; and output, by the network interface, the hotspot confidence score and the network graph.

16. The computer program product of claim 15, wherein the hotspot confidence score is based on a weight for each of a location within the network graph, the set of hotspot characteristics, and the first user feedback.

17. The computer program product of claim 16, wherein the first user feedback includes hiding a second node of the network graph.

18. The computer program product of claim 17, wherein the hotspot confidence score is generated in response to the learning model being updated.

19. The computer program product of claim 17, wherein the second node is noise in the second graph.

20. The computer program product of claim 17, wherein the first user feedback is validated by a second user.

\* \* \* \* \*